(12) United States Patent
Weber et al.

(10) Patent No.: US 6,926,952 B1
(45) Date of Patent: *Aug. 9, 2005

(54) ANTI-REFLECTIVE POLYMER CONSTRUCTIONS AND METHOD FOR PRODUCING SAME

(75) Inventors: Michael F. Weber, Shoreview, MN (US); Andrew J. Ouderkirk, Woodbury, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,379

(22) Filed: Jan. 13, 1998

(51) Int. Cl.[7] .............................. B32B 7/02
(52) U.S. Cl. ............... 428/212; 428/213; 428/421; 428/480; 428/446; 428/483; 428/498
(58) Field of Search ................. 428/212, 213, 428/421, 480, 30, 446, 483; 359/498

(56) References Cited

U.S. PATENT DOCUMENTS

| | | | |
|---|---|---|---|
| 3,124,639 A | 3/1964 | Kahn | 88/65 |
| 3,588,216 A | 6/1971 | Bloom | 350/1 |
| 3,610,729 A | 10/1971 | Rogers | 350/157 |
| 3,711,176 A | 1/1973 | Alfrey, Jr. et al. | 350/1 |
| 3,854,796 A | 12/1974 | Thelen | 350/164 |
| 3,860,036 A | 1/1975 | Newman, Jr. | 138/45 |
| 4,046,457 A | 9/1977 | Land et al. | 350/164 |
| 4,337,990 A | 7/1982 | Fan et al. | 350/1.7 |
| 4,446,305 A | 5/1984 | Rogers et al. | 528/348 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,710,426 A * | 12/1987 | Stephens | 426/336 |
| 4,720,426 A | 1/1988 | Englert et al. | 428/344 |
| 4,721,349 A | 1/1988 | Fan et al. | 350/1.7 |
| 5,103,337 A * | 4/1992 | Schrenk et al. | 359/359 |
| 5,139,879 A | 8/1992 | Aharoni et al. | 428/422 |
| 5,188,760 A | 2/1993 | Hikmet et al. | 252/299.01 |
| 5,211,878 A | 5/1993 | Reiffenrath et al. | 252/299.63 |
| 5,225,244 A | 7/1993 | Aharoni et al. | 427/240 |
| 5,233,465 A | 8/1993 | Wheatley et al. | 359/359 |
| 5,234,729 A * | 8/1993 | Wheatley et al. | 428/30 |
| 5,235,443 A | 8/1993 | Barnik et al. | 359/37 |
| 5,269,995 A | 12/1993 | Ramanathan et al. | 264/171 |
| 5,294,657 A | 3/1994 | Melendy et al. | 524/270 |

(Continued)

FOREIGN PATENT DOCUMENTS

EP 224 985 6/1987 ............ G02B 1/10

(Continued)

OTHER PUBLICATIONS

Schrenk et al., Nanolayer polymeric optical films, Tappi Journal, pp. 169-174, Jun., 1992.

(Continued)

*Primary Examiner*—Dawn Garrett
(74) *Attorney, Agent, or Firm*—Milena G. Higgins

(57) ABSTRACT

Articles, including free-standing films, comprising a base comprising a polymer layer having a major surface; and an anti-reflective stack optically coupled to the base that reduces the reflectivity of the base at over a first wavelength range of interest. The anti-reflective stack comprises alternating layers of (i) high index polymer; and (ii) low index polymer. Methods of making such articles are also provided.

14 Claims, 6 Drawing Sheets

U.S. PATENT DOCUMENTS

| | | | |
|---|---|---|---|
| 5,316,703 A | 5/1994 | Schrenk | 264/1.3 |
| 5,319,478 A | 6/1994 | Fijnfschilling et al. | 359/53 |
| 5,389,324 A | 2/1995 | Lewis et al. | 264/171 |
| 5,448,404 A | 9/1995 | Schrenk et al. | 359/584 |
| 5,486,935 A | 1/1996 | Kalmanash | 359/37 |
| 5,486,949 A * | 1/1996 | Schrenk et al. | 359/498 |
| 5,494,743 A | 2/1996 | Woodard et al. | 428/336 |
| 5,579,162 A | 11/1996 | Bjornard et al. | 359/580 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/134 |
| 5,808,794 A | 9/1998 | Weber et al. | 359/487 |
| 5,808,798 A * | 9/1998 | Weber et al. | 359/583 |
| 5,825,542 A | 10/1998 | Cobb, Jr. et al. | 359/487 |
| 5,825,543 A | 10/1998 | Ouderkirk et al. | 359/494 |
| 5,882,774 A * | 3/1999 | Jonza et al. | 428/212 |
| 5,965,247 A * | 10/1999 | Jonza et al. | 428/212 |
| 6,104,530 A * | 8/2000 | Okamura et al. | 359/359 |

FOREIGN PATENT DOCUMENTS

| | | | |
|---|---|---|---|
| EP | 2 232 498 | 12/1990 | |
| EP | 417 517 | 3/1991 | G03F 1/14 |
| EP | 564134 | 10/1993 | G02B 1/10 |
| GB | 2232498 | * 12/1990 | |
| JP | 58 046301 | 3/1983 | G02B 1/10 |
| JP | SHO 60-237450 | 11/1985 | G03F 1/00 |
| JP | SHO 61-209449 | 9/1986 | G03F 1/00 |
| WO | WO 95/27919 | 4/1995 | G02B 27/28 |
| WO | WO 95/17303 | 6/1995 | B32B 7/02 |
| WO | WO 95/17691 | 6/1995 | G02B 5/30 |
| WO | WO 95/17692 | 6/1995 | G02B 5/30 |
| WO | WO 95/17699 | 6/1995 | G02F 1/1335 |
| WO | WO 96/19347 | 6/1996 | B32B 7/02 |
| WO | WO 96/31343 | 10/1996 | B32B 19/00 |
| WO | WO 97/01440 | 1/1997 | B32B 27/36 |
| WO | WO 97/01774 | 1/1997 | G02B 1/10 |
| WO | WO 97/01788 | 1/1997 | G02F 1/1335 |
| WO | WO 97/32226 | 9/1997 | G02B 5/30 |
| WO | WO 97/48992 | 12/1997 | G02B 1/11 |

OTHER PUBLICATIONS

Floch, H.G. et al., A Scratch-Resistant Single-Layer Antireflective Coating by a Low Temperature Sol-Gel Route, Journal of Sol-Gel Science and Technology 1:293-304 (1994).

Hollahan, John R. et al., "Combination Moisture Resistant and Antireflection Plasma Polymerized Thin Films for Optical Coatings", Applied Optics, vol. 13, No. 8, Aug. 1974, pp. 1844-1849.

Innovator's Digest, Mar. 6, 1996, p. 36, Using a Vacuum Web Coater to Apply Multilayer Thin-Film Coatings on Flexible Substrates [960517].

Larsen, Ted L., Thin Film Coatings on Flexible Plastic Substrates for Display and Other Optical and Electronic Applications, SID International Symposium & Exhibition, San Diego, CA May 1996.

Optical Coating Laboratory, Inc. and Nitto Denko, Setting a New Standard for LCD Viewing: The Nitto Denko/OCLI Alliance, Undated.

Parich, M.D. et al., Linear Polarizer Advancements with the use of Hydrophoic Mulit-Layer Thin Film Coating Technologies, Undated.

Unknown, PNL's Multilayer Thin Film Process, Optical Materials & Engineering News, Jul. 1995, p. 3.

* cited by examiner

ANTI-REFLECTIVE POLYMER CONSTRUCTIONS AND METHOD FOR PRODUCING SAME

BACKGROUND OF THE INVENTION

This invention relates to providing anti-reflective properties.

Anti-reflective layers, e.g., in the form of thin films, are used to prevent unwanted reflection at surfaces. Such reflection is particularly undesirable in the case of, e.g., cathode ray tubes, liquid crystal displays, and windows because it causes glare and can reduce the brightness and contrast of a displayed image.

Traditional anti-reflective layers have been made from inorganic materials, e.g., magnesium fluoride, that are coated onto an optical element such as a glass lens. Using a quarter-wavelength thick anti-reflective layer can reduce the reflection considerably for the selected wavelength because of destructive interference.

SUMMARY OF THE INVENTION

In a first aspect, the invention features an article that includes a plurality of polymer layers, each having a thickness no greater than about 1 micrometer and collectively forming a free-standing film. The layers are selected such that when the article is optically coupled to a surface of a substrate having a refractive index of about 1.50, the article reduces the reflectivity of the substrate at the surface over a wavelength range of interest by a factor of at least about 2 at normal angles of incidence. The article may be optically coupled to the substrate surface, e.g., by adhering it to the substrate surface. Materials are said to be "optically coupled" when the air space between them is replaced by a material with an index of refraction similar to that of the two articles, or when the air space is reduced in thickness to a value much less than a quarter wavelength.

In a second aspect, the invention features an article that includes a plurality of polymer layers, each having a thickness no greater than about 1 micrometer and collectively forming a free-standing film, in which the polymer layers are selected such that the reflectivity measured in air over a wavelength range of interest at normal angles of incidence is no greater than about 6%, preferably no greater than about 3%, and more preferably no greater than about 1%.

In preferred embodiments of the first and second aspects of the invention, the polymer layers are selected from the group consisting of polymer compositions that are co-extrudable with each other. Examples of suitable polymers include relatively low index polymers such as silicone polymers, fluoropolymers (e.g., a vinylidene fluoride-tetrafluoroethylene-hexafluoropropylene terpolymer), fluoro-chloropolymers, methacrylate polymers, polyester copolymers, and combinations thereof, and relatively high index polymers such as polyesters, polycarbonates, polysulfones, polyethersulfones, and combinations thereof. Preferably, the article includes two adjoining polymer layers in which the refractive indices of the adjoining layers are different from each other. At least one polymer layer preferably has an index of refraction less than about 1.55.

The article may further include an inorganic layer. Examples of suitable inorganic layers include zirconia, titania, tin oxide, indium oxide-tin oxide, silver, aluminum, and combinations thereof. The article may also include a layer for modifying the mechanical, chemical, or electrical properties, or combination thereof, of the film.

Each of the polymer layers is preferably oriented in substantially the same direction and to substantially the same degree as the other layers. The article preferably is provided in the form of a flexible film.

In a third aspect, the invention features an article in the form of a free-standing film that includes: (a) a base that includes a polymer layer having a major surface; and (b) an anti-reflective stack optically coupled to the major surface of the base that reduces the reflectivity of the base at the major surface of the base over a first wavelength range of interest. The stack includes alternating layers of (i) high index polymers having an index of refraction greater than about 1.55 and (ii) low index polymers having an index of refraction less than about 1.55. The article may be used to modify the optical properties of a substrate by optically coupling the article to a surface of the substrate, e.g., by adhering the article to the surface.

In preferred embodiments of the third aspect of the invention, the polymer layers of the base and the stack are selected from the group consisting of polymer compositions that are co-extrudable with each other. Examples of suitable polymers for the stack include relatively low index polymers such as silicone polymers, fluoropolymers (e.g., a vinylidene fluoride-tetrafluoroethylene-hexafluoropropylene terpolymer), fluoro-chloropolymers, methacrylate polymers, polyester copolymers, and combinations thereof, and relatively high index polymers such as polyesters, polycarbonates, polysulfones, polyethersulfones, and combinations thereof. Each of the polymer layers of the base and stack is preferably oriented in substantially the same direction and to substantially the same degree as the other layers.

Each of the layers of the stack preferably has a thickness no greater than about 1 micrometer. The particular thickness values for individual layers are chosen using computer modeling and generally fall within the range of about $\frac{1}{16}$ wavelength to about 1 wavelength.

The stack may include a polymer layer having a refractive index that is greater than or equal to the highest refractive index of the base. A particularly preferred layer for the stack is a birefringent polymer layer having two orthogonal optic axes parallel to the plane of the film.

The stack may further include an inorganic layer. Examples of suitable inorganic layers include zirconia, titania, tin oxide, indium oxide-tin oxide, silver, aluminum, and combinations thereof. The stack may also include a layer for modifying the mechanical, chemical, or electrical properties, or combination thereof, of the film.

The base may include a pair of opposed major surfaces, each of which is optically coupled to an anti-reflective stack. The base may include a plurality of alternating layers of a first polymer and a second polymer in which the first polymer has a higher index of refraction associated with at least one in-plane axis than adjoining layers of the second polymer. Examples of suitable materials for the first and second polymer include polyethylene naphthalate and a polyethylene naphthalate copolymer, respectively.

In one preferred embodiment, the base includes a multilayer reflective polarizer which selectively reflects light of one polarization and transmits light of a second polarization at normal angles of incidence over a second wavelength range of interest. The polarizer may feature alternating layers of polyethylene naphthalate and a polyethylene naphthalate copolymer.

In another preferred embodiment, the base includes a multilayer mirror that reflects light of two orthogonal polarizations at normal angles of incidence over a second wavelength range of interest. The mirror may feature alternating layers of polyethylene naphthalate and (a) a polyethylene naphthalate copolymer, (b) polymethyl methacrylate, or (c) a terephthalic acid copolymer (e.g., poly(ethylene glycol-co-cyclohexane-1,4-dimethanol terephthalate)).

In a fourth aspect, the invention features a process for preparing an article that includes co-extruding a plurality of polymer compositions with each other to form a plurality of polymer layers in the form of a free-standing film, the polymer layers being selected such that when the article is optically coupled to a substrate, the article reduces the reflectivity of the substrate over a wavelength range of interest.

The polymer layers are preferably selected such that when the article is optically coupled to a substrate having a refractive index of about 1.50, the article reduces the reflectivity of the substrate over a wavelength range of interest by a factor of at least about 2. Preferably, the polymer compositions are co-extruded such that each of the resulting polymer layers has a thickness no greater than about 1 micrometer. The polymer compositions are preferably extruded with one or more additional polymer compositions to form one or more removable skin layers on a surface of the article to protect the article.

In a fifth aspect, the invention features a process for preparing an article that includes co-extruding a plurality of polymer compositions with each other to form a plurality of polymer layers in the form of a free-standing film, the polymer layers being selected such that the reflectivity measured in air over a wavelength range of interest at normal angles of incidence is no greater than about 6%, preferably no greater than about 3%, and more preferably no greater than about 1%.

Preferably, the polymer compositions are co-extruded such that each of the resulting polymer layers has a thickness no greater than about 1 micrometer. The polymer compositions are preferably extruded with one or more additional polymer compositions to form one or more removable skin layers on a surface of the article to protect the article.

In a sixth aspect, the invention features a process for preparing an article that includes (a) co-extruding a plurality of polymer compositions with each other to form a free-standing film, where the film includes (i) a base that includes a polymer layer having a major surface, (ii) a precursor anti-reflective construction that includes a polymer layer, and (iii) at least one removable polymer layer; and (b) stretching the film to convert the precursor anti-reflective construction to an anti-reflective construction optically coupled to the major surface of the base and selected to reduce the reflectivity of the base at the major surface over a wavelength range of interest. In some preferred embodiments, the base, the stack, or both, includes a plurality of polymer layers. The process preferably includes the step of stripping the removable polymer layer from the film prior to stretching the film; the removable polymer layer may also be removed subsequent to stretching the film. Examples of preferred materials for the removable polymer layer include polyethylene, polypropylene, atactic polystyrene, and combinations thereof.

The invention provides lightweight, relatively inexpensive, polymeric anti-reflective constructions that can be used alone or in combination with a number of materials, including multilayer polymeric polarizers and mirrors. The structure and properties of the anti-reflective construction can be tailored to render it effective over a selected portion of the electromagnetic spectrum. In addition, unlike conventional vacuum-deposited anti-reflective coatings, the polymeric anti-reflective constructions according to the invention can readily be aplied to non-planar (e.g., curved) surfaces such as cathode ray tubes.

Other features and advantages of the invention will be apparent from the following description of the preferred embodiments thereof, and from the claims.

DESCRIPTION OF THE PREFERRED EMBODIMENTS

Structure

Anti-reflective (AR) constructions are preferably provided in the form of free-standing films, i.e., films having sufficient mechanical integrity that they can be readily handled without the need for additional reinforcing layers. The anti-reflective properties can be tailored to cover a selected range of electromagnetic frequencies, including portions of the visible, infrared (1R), and ultraviolet (UV) regions of the electromagnetic spectrum.

The AR constructions may be used alone (such that the film forms an interface with air) or optically coupled to one or both major surfaces of a base; in the latter case, the AR construction de-reflects radiation impinging upon the surface of the base at the base/AR construction interface. The AR construction may be adhered to the surface of the base. Preferably, however, it is formed simultaneously with the base by co-extrusion, as described in more detail, below. In addition, the base/AR construction article may itself be optically coupled, e.g., by means of an adhesive to yet another surface, e.g., a window.

The AR construction may consist of any number of polymer layers, typically ranging from one to several tens of layers. The AR polymer layers may be optically thin, e.g., with a thickness of between about 0.010 μm and about 0.25 μm or optically thick, e.g., with a thickness of greater than about 0.25 μm, or a combination of optically thin and optically thick layers. The particular thickness values are selected depending upon the portion of the electromagnetic spectrum over which the film is designed to operate and, where the AR construction is optically coupled to a base, the optical characteristics of the base. The AR polymer layers are preferably made from polymer compositions that are co-extrudable with each other and, where the AR construction is optically coupled to a base, the materials forming the base.

Figure 1A:
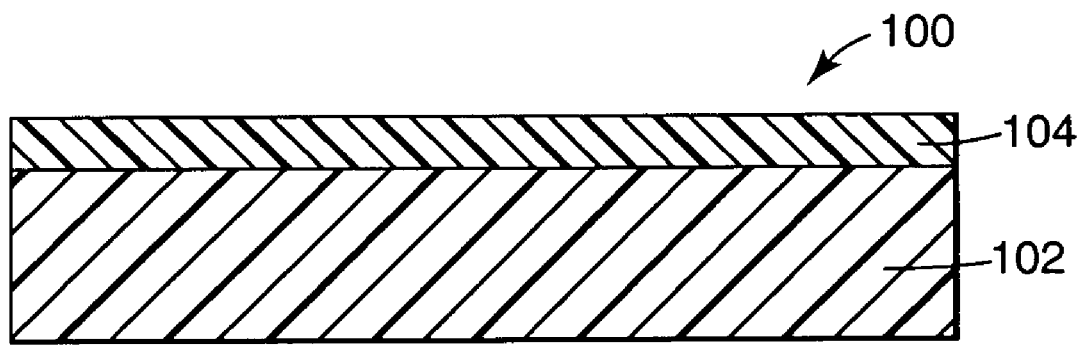
FIG. 1A is a schematic sectional view of an article featuring a base optically coupled to a single-layer anti-reflective ("AR") construction.

An example of a single layer AR construction is schematically shown in FIG. 1A. As shown in the figure, article 100 features a base 102 and an anti-reflective polymer layer 104. AR layer 104 (which may be optically thick or thin) preferably is made from a thermoplastic polymer with a lower index of refraction than base 102. Specifically, reflection is minimized when AR layer 104 has an index of refraction that is approximately the square root of a multiple of the index of refraction of the base and the surrounding medium (e.g. air), and is a quarter wavelength thick. Preferred polymers for AR layer 104 typically have an index of refraction less than about 1.45, more preferably less than about 1.38.

Suitable low index polymers for AR layer 104 include silicone polymers, methacrylate polymers, fluoropolymers, polyester copolymers, and fluoro-chloropolymers. Particularly preferred are fluoropolymers such as THV-500™ fluoropolymer (Dyneon LLC, St. Paul, Minn.), a vinylidene fluoride-tetrafluoroethylene-hexafluoropropylene terpolymer which has an index of refraction of 1.36, in the form of quarter wavelength layers on the base. These polymers can reduce the total surface reflectivity of a relatively high index of refraction base by about a factor of 2 irrespective of layer thickness. As a specific example, biaxially oriented polyethylene terephthalate (PET) has an index of refraction of 1.66 and reflectivity for visible light of 6.0% per surface at a normal angle of incidence. Covering such a biaxially oriented PET base with an optically thick layer of THV-500™ fluoropolymer will reduce the reflectivity of the combined film to a calculated value of about 3.26% per side. Reflectivity would be reduced even further if the THV layer were a quarter wavelength thick.

Figure 2A:
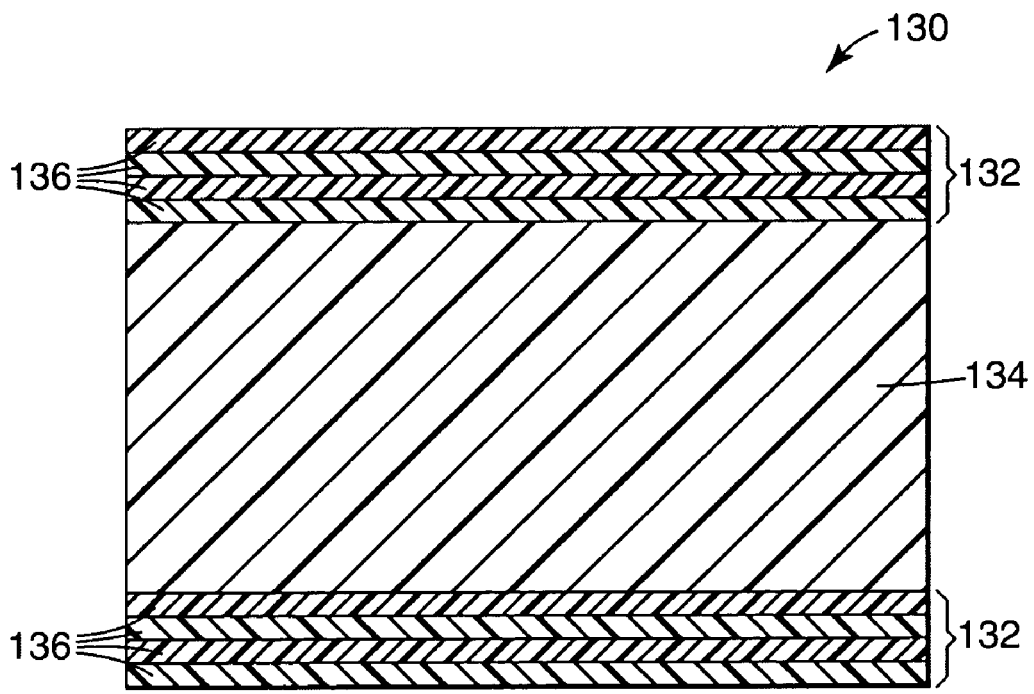
FIG. 2A is a schematic sectional view of an article featuring a base optically coupled to a multilayer AR construction.

To lower the reflectivity even further, it may be preferable to use a thin film, multilayer AR construction. Such constructions offer the advantage of improved broad band reduction in reflectivity relative to single-layer AR constructions while maintaining acceptable bandwidths. A multilayer AR construction is shown in FIG. 2A. With reference to FIG. 2A, an article 130 features a base 134 provided on two sides with a multilayer AR stack 132; it is also possible to provide the AR stack on only one side of the base. Each layer 136 of the AR stack 132 will generally be optically thin, although optically thick layers, or a combination of optically thin and optically thick layers, can be used as well.

AR stacks 132 can consist of any number of material layers 136 depending on the optical characteristics of the base and the desired portion of the electromagnetic spectrum over which AR stacks 132 are designed to operate. Stacks having two or more layers can produce lower reflectivity over a wider band than a single layer, especially if the base has an index of refraction below about 1.60. With multiple layers in the AR stack, reflections from multiple interfaces can destructively interfere to reduce the overall reflectivity.

One of the materials in a multilayer AR stack preferably has an index equal to or higher than that of the highest index of refraction associated with the base. Since a multilayer stack of only two materials can be designed to function as an equivalent single layer of almost any index, AR stacks having four or more layers can be made using only two materials, and have a wider bandwidth than a three material, three-layer stack. This is useful in the case of articles prepared by co-extrusion (as described below) because in the co-extrusion process it is easier to add extra layers of existing materials than to add a new material. Suitable materials for the AR layers include thermoplastic polymers such as, for example, polyethylene terephthalate, polybutylene terephthalate, polyethylene naphthalate, 2,6-polybutylene naphthalate, polyamides, polycarbonates, atactic polystyrene, syndiotactic polystyrene, and polymethyl methacrylate. Copolymers based upon these materials may also be suitable.

Layers having different refractive indices may be separated by "tie layers" having indices intermediate those of surrounding layers. Such layers are particularly useful for improving the adhesion between layers in the stack. An example of such a construction features, in order of decreasing index of refraction, polycarbonate/polymethyl methacrylate/polyvinylidene fluoride/THV fluoropolymer, where the polymethyl methacrylate and polyvinylidene fluoride act as a tie layer to improve the adhesion between the polycarbonate and the THV fluoropolymer.

Figure 7:
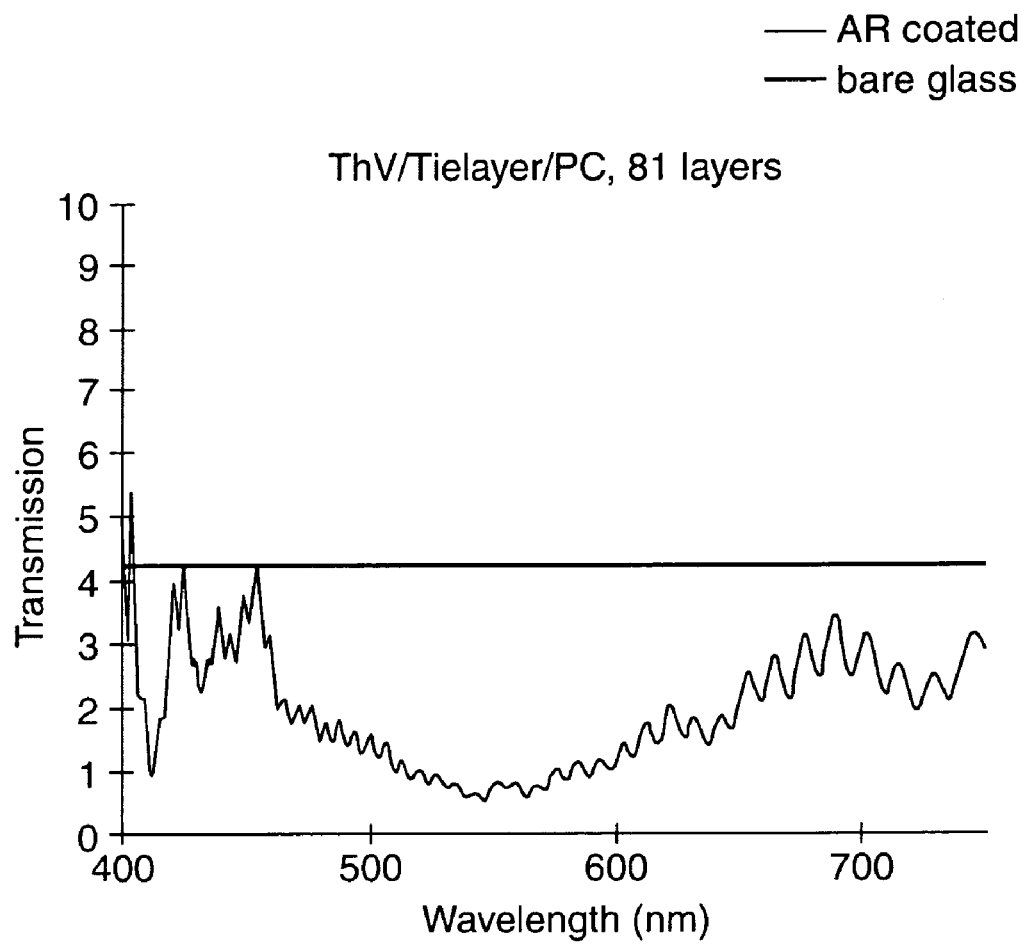
FIG. 7 is a plot of transmission versus wavelength for a glass base optically coupled to an 81-layer THV/PMMA-PVDF/PC construction, where the PMMA-PVDF acts as a tie layer.

FIG. 7 illustrates calculated transmission values for an eighty one layer AR construction utilizing polycarbonate ("PC") and THV fluoropolymer as the high and low index layers, respectively, on a glass substrate, with polymethyl methacrylate ("PMMA")-polyvinylidene fluoride ("PVDF") acting as a tie layer. The refractive index of the tie layer was allowed to float between 1.45 and 1.55, and ended with an optimized index of 1.497. The stack was optimized to anti-reflect a glass surface. As shown in FIG. 7, a significant anti-reflective effect was obtained.

Particularly preferred articles include those in which one or more of the AR stack layers 136 is made of the same material or materials as the base 134, or as one or more layers of the base. For example, if a multilayer base film is to be de-reflected over a portion of the wavelength spectrum, e.g., in the case of a base functioning as an IR mirror provided with an AR construction designed to de-reflect visible light, it would be desirable to design the AR stack from the same materials as the mirror itself.

Another example of a useful article is one featuring a multilayer AR construction combining both polymer layers and layers of higher index inorganic materials.

In one embodiment, the inorganic material would have an index of refraction intermediate that of the base and the organic polymer. For example, the inorganic material could be a sol gel-deposited layer of alumina or a zirconia-silica mix on a PEN base and the organic polymer could be a fluoropolymer such as THV-500™.

In another embodiment, the inorganic material would have an index of refraction higher than that of the base. For example, the inorganic material could be a sol gel-deposited layer of zirconia or titania on a PEN base and the organic polymer could be a quarter wavelength thick fluoropolymer such as THV-500™.

In another embodiment, the inorganic material could be silver, aluminum, or a quarter or half wavelength thick layer of a transparent conductor such as indium-tin oxide (ITO)

having far IR rejection capabilities, and the polymer layer could be a quarter wavelength thick fluoropolymer such as THV-500™.

In yet another embodiment, the inorganic material could be combined with a multilayer polymer construction.

Materials useful for the base include both organic polymers and inorganic materials such as ceramics and glasses having relatively high refractive indices. Particularly preferred base materials are single and multilayer polymer films. Examples of suitable single layer polymer films include polyethylene terephthalate and polycarbonate films; such films, in turn, may be uniaxially or biaxially oriented. One example of a suitable multilayer polymer film is one in which the thickness of the individual polymer layers is no greater than about 0.5 micrometers, as described in Wheatley et al., U.S. Pat. No. 5,278,694, which is hereby incorporated by reference.

A second example of a suitable multilayer polymer film is described in commonly assigned U.S. patent application Ser. No. 08/402,041, filed Mar. 10, 1995, the disclosure of which is hereby incorporated by reference. Very briefly, that application describes the construction of multilayer polymer films (mirrors and polarizers) for which the Brewster angle (the angle at which reflectance goes to zero) is very large or is nonexistent for the polymer layer interfaces. This allows for the construction of multilayer mirrors and polarizers whose reflectivity for p polarized light decreases slowly with angle of incidence, is independent of angle of incidence, or increases with angle of incidence away from the normal. As a result, multilayer films having high reflectivity for both s and p polarized light over a wide bandwidth, and over a wide range of angles can be achieved.

The relationships between the indices of refraction in each film layer of the base to each other determine the reflectance behavior of the base at any angle of incidence, from any azimuthal direction. The principles and design considerations described in U.S. patent application Ser. No. 08/402,041 can be applied to create multilayer bases having the desired optical effects for a wide variety of circumstances and applications. The indices of refraction of the layers in the multilayer base can be manipulated and tailored to produce devices having the desired optical properties. Many useful devices, such as mirrors and polarizers having a wide range of performance characteristics, can be designed and fabricated using the principles described therein.

Particularly preferred combinations of layers in the case of polarizers include polyethylene naphthalate ("PEN")/coPEN, polyethylene terephthalate ("PET")/coPEN, PEN/syndiotactic polystyrene ("SPS"), PET/SPS, PEN/Estar, and PET/Estar, where "coPEN" refers to a copolymer or blend based upon naphthalene dicarboxylic acid, and "Estar" is a copolymer of terephthalic acid, ethylene glycol, and cyclohexane-1,4-dimethanol that is commercially available from Eastman Chemical Co.

Particularly preferred combinations of layers in the case of mirrors include PET/Ecdel, PEN/Ecdel, PEN/SPS, PEN/THV, PEN/polymethyl methacrylate ("PMMA"), PEN/co-PET, and PET/SPS, where "coPET" refers to a copolymer or blend based upon terephthalic acid (as described above), "Ecdel" is a copolymer of cyclohexane dicarboxylic acid, ethylene glycol, and cyclohexane-1,4-dimethanol that is commercially available from Eastman Chemical Co., and "THV" is a fluoropolymer commercially available from 3M Co.

The number of layers in the base is selected to achieve the desired optical properties using the minimum number of layers for reasons of film thickness, flexibility, and economy. In the case of both polarizers and mirrors, the number of layers is preferably less than about 10,000, more preferably less than about 1,000.

A further criteria must be considered when designing AR constructions for non-normal incident angles with birefringent polymers such as oriented crystalline or partially crystalline polymers. In these cases, it is necessary to account for the anisotropy of the index of refraction. In other words, for non-normal angles, the reflection will depend on the index normal to the film plane as well the in-plane indices, for both the substrate and the AR construction. If the two in-plane indices are different (biaxial birefringence), these differences must be taken into account for all angles of incidence.

Figure 3:
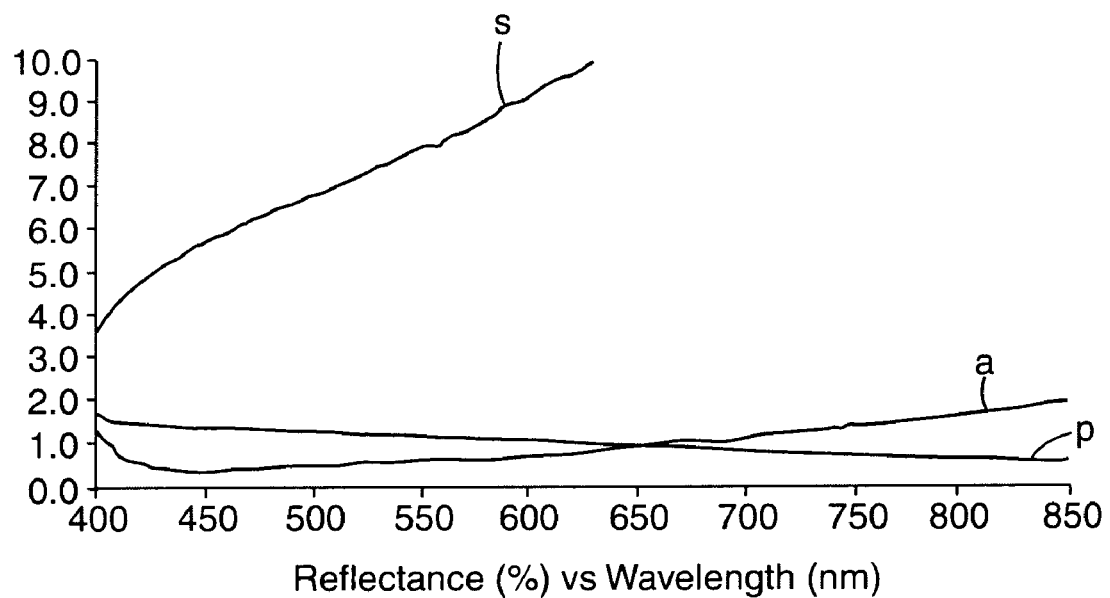
FIG. 3 is a plot of reflectivity versus wavelength for a PET base optically coupled to a 4-layer THV/PEN AR construction calculated at 0° relative to the normal (curve a) and 60° relative to the normal for s polarized light (curve s) and p polarized light (curve p).

FIG. 3 illustrates calculated reflectivities for a four layer AR construction consisting of alternating THV and PEN layers deposited on a PET substrate. The order of indices of refraction starting from the layer near the air interface is 1.37/1.74/1.37/1.74/1.65 (PET). The reflectivities are calculated for normal incidence, unpolarized light (curve a), for s-polarized light at 60° relative to the normal (curve s), and p-polarized light at 60° relative to the normal (curve p).

Figure 6:
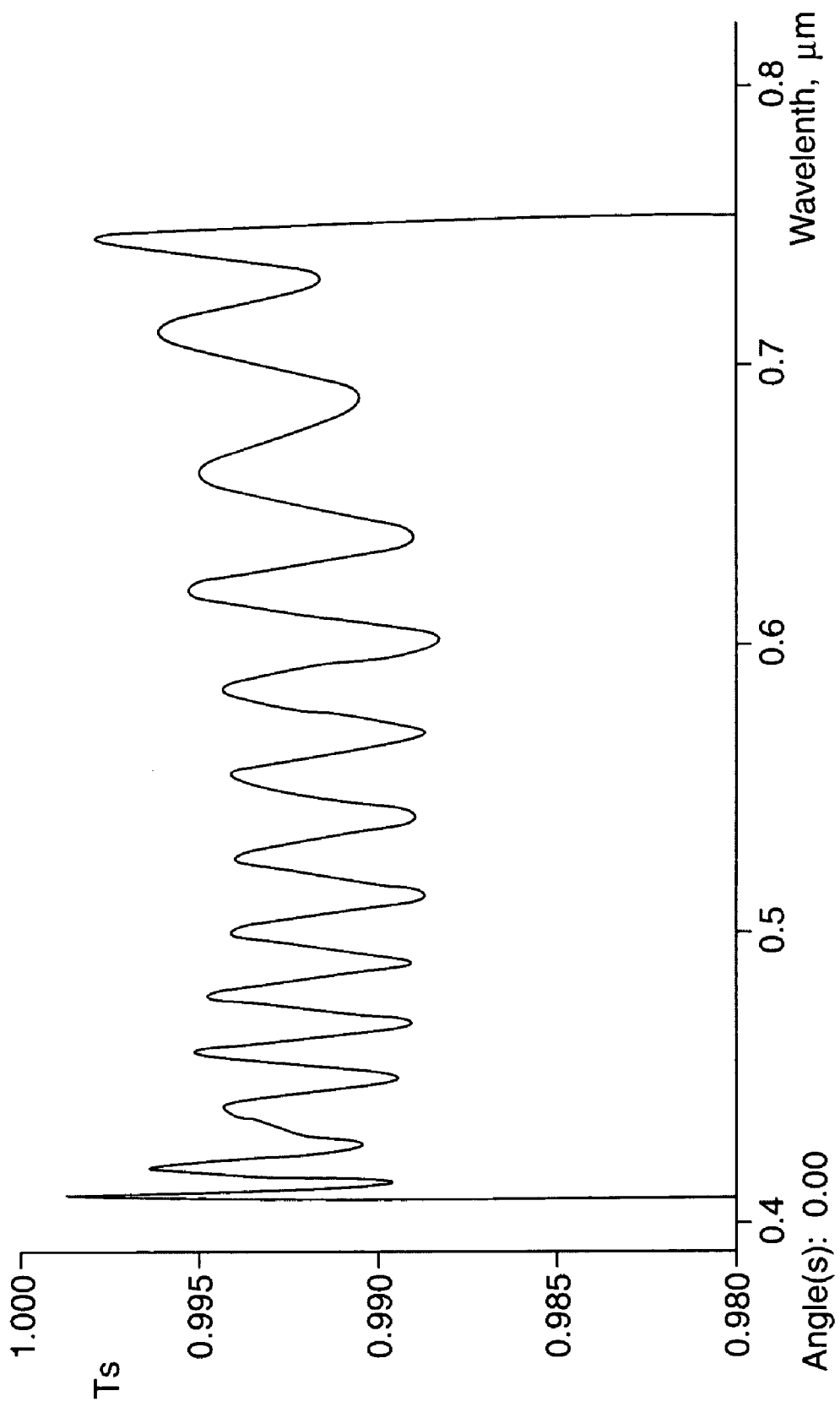
FIG. 6 is a plot of reflectivity versus wavelength for a PET base optically coupled to a 44-layer PEN/PMMA AR construction calculated at 0° relative to the normal.

FIG. 6 illustrates calculated transmissivities for a forty four layer AR construction consisting of alternating PEN and PMMA layers deposited on a PET substrate. The transmissivities are calculated for normal incidence, unpolarized light.

Manufacture

AR constructions may be manufactured by co-extrusion using a feedblock method, e.g., as described in co-pending U.S. patent application Ser. No. 08/402,041. Where the AR construction is optically coupled to a mono- or multilayer polymer base, the article is preferably formed by co-extruding the AR construction with the base to form the article in a single step.

Co-extrusion of optically thin AR layers may be difficult due to the shear forces in an extrusion system causing an unstable polymer flow. Extrusion coating of thin layers may also be difficult to control. Thus, to prepare optically thin AR layers, it is generally preferred to extrude relatively thick polymer layers and then stretch the resulting material to produce the desired final thickness. The stretching process will also result in the orientation of certain polymers, with the degree of orientation related to the amount of stretching.

Figure 1B:
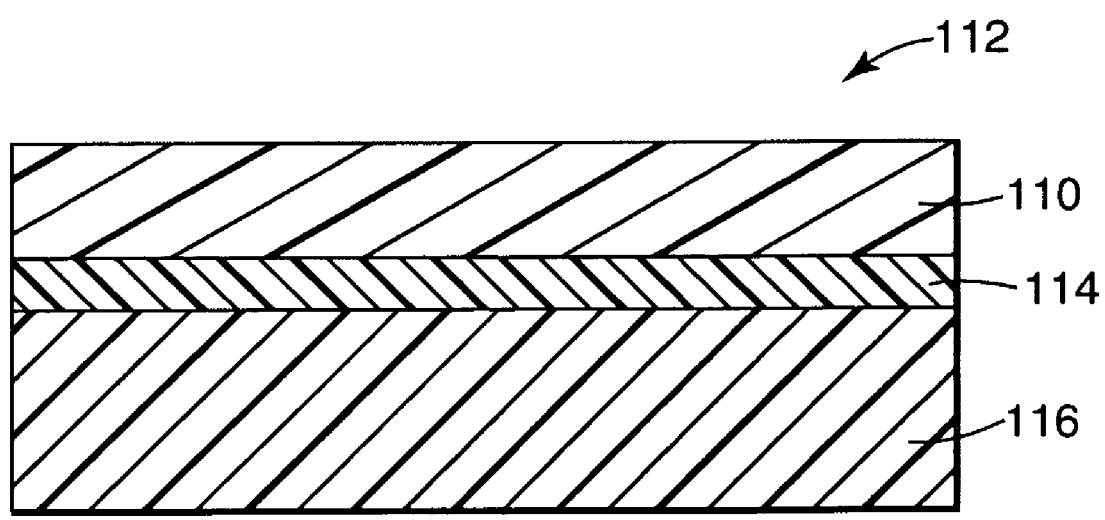
FIG. 1B is a schematic sectional view of an article featuring a base optically coupled to a single-layer AR construction, in which a removable skin layer is positioned over the AR construction.

The effect of shear forces produced during co-extrusion can also be reduced by co-extruding one or more relatively thick "skin layers" when forming the article. As shown in FIG. 1B, article 112 is provided with a skin layer 110 that absorbs much of the shear forces developed during extrusion. In one simplified construction, skin layer 110 is placed on top of AR layer 114, and AR layer 114 is on top of base 116. By appropriate selection of the composition of the skin layer 110, the skin layer 110 can be removed from all or a portion of article 112. If the final article 112 is stretched, skin layer 110 can be removed either before or after stretching. The presence of one or more skin layers in the co-extrusion process may also assist with the production of multilayer AR stacks.

Suitable materials for the skin layer include co-extrudable polymers such as polyethylene, polypropylene, and atactic polystyrene. These materials generally will not adhere strongly to most suitable materials for the AR layer(s). The addition of the skin layer allows the AR layer(s) to be extruded without structural damage and, if desired, subsequently stretched to form optically thin layer(s).

A thick "skin layer" may be useful itself as an AR layer in reducing reflectance if it were made of a polymer having a relatively low index of refraction such as THV-500 fluoropolymer (n=1.36). For example, in the case of a PET substrate provided with a THV AR layer, the air/THV interface reflects only about 2.33% of the light. The THV/PET interface reflects 0.93%. Bare PET (n=1.65) reflects 6.0%, so the use of a THV skin layer would reduce this value to 3.26%. The 0.93% reflection value at the PET/THV interface could be reduced even further by incorporating one or more intermediate layers, or by grading the index with the use of a third polymer which is miscible with both PET and THV-500.

Figure 2B:
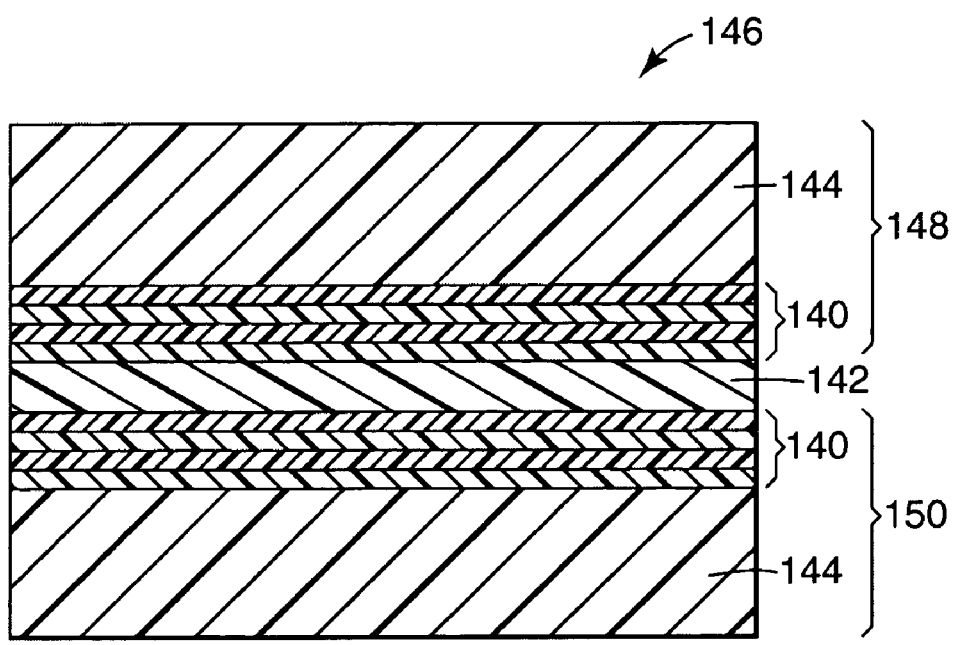
FIG. 2B is a schematic sectional view of an article featuring a pair of bases, each optically coupled to a multilayer AR construction, in which the two structures are separated by an internal skin layer.

Another design involving skin layers is shown in FIG. 2B. In this design, useful in cases where the base has only one side provided with an AR construction, two AR stacks 140 are placed roughly in the middle of an intermediate article 146. The two AR stacks are separated by an internal skin layer 142. The base 144 are oriented outward. From this construction, two articles 148, 150 can later be formed by separating skin layer 142 from the layers forming each AR stack 140. In this way, the AR stacks are not subject to high shear during the extrusion process. Additional AR stacks and/or skin layers can be extruded along the outer surfaces, if desired.

Following co-extrusion and removal of skin layers (if present), additional materials may be deposited on the outermost layer of the AR construction, in which case the stack is pre-designed using computer modeling to factor in the presence of these layers and their effect on the optical properties of the stack. For example, inorganic materials such as alumina, zirconia, silica, titania, and combinations thereof can be deposited in the form of a sol-gel. Other inorganic materials, e.g., indium-tin oxide and metals such as silver or aluminum can be vapor coated onto the outermost layer of the AR construction. If desired, the resulting construction can then be solution coated with a fluoropolymer to form a hybrid AR construction, as described above. The fluoropolymer could also be solution-coated directly onto the outermost layer of the AR construction.

Applications

The AR constructions are useful in a variety of applications. The particular design is selected based upon the application.

Figure 4:
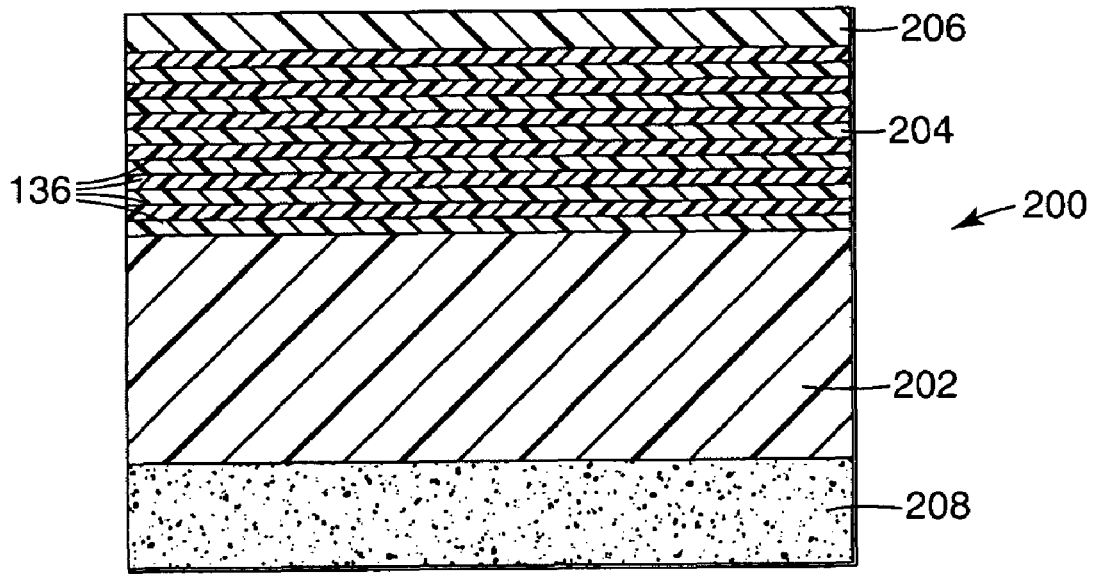
FIG. 4 is a schematic sectional view of an article featuring a base provided with an optical coupling agent for attachment to a substrate, in which the base is further optically coupled to a multilayer AR construction.

FIG. 4 shows an article 200 which may be optically coupled to a substrate to provide anti-reflective properties. It is useful in applications for which higher optical transmission and/or reduced glare are desired. Representative substrates include, e.g., goggles, eyeglasses, display windows, paper labels or sheets, opaque but glossy surfaces, luminares and lighting fixtures, low temperature light bulbs, computer monitors, and liquid crystal displays (both backlit and front lit).

Article 200 is also useful as a substrate for coatings such as photographic emulsions when it is desirable to suppress even the minute reflection that occurs at the solid/solid interface between the coating and substrate. Such an article may optionally be optically coupled to another article. The AR stack serves to dereflect the interface between the monolayer base film and the coating. For example, in the case of photographic emulsions designed for laser exposure, the AR stack will prevent the typical "woodgrain" pattern caused by interference of coherent light reflected from both the top and bottom interfaces of the emulsion.

Article 200 features a relatively thick, birefringent monolayer base 202, a multilayer anti-reflective stack 204 optically coupled to the base, and an additional layer 206 for providing desired mechanical, chemical, and/or electrical properties. Layer 206 may be part of the final article or it may be strippable, e.g., a strippable skin layer, that is removed to yield the final article. An optical coupling agent 208 is used to secure article 200 to a substrate. Stack 204, which includes a plurality of polymer layers 210 featuring alternating layers of birefringent polymers and low index polymers is designed to de-reflect base 202.

Article 200 is prepared by co-extruding base 202 and stack 204 in the form of a unitary article, and then stretching the article until a pre-determined thickness is reached. Stretching produces high in-plane indices of refraction in the case of crystalline and semi-crystalline polymers described above.

Base 202 is selected to provide sufficient mechanical strength and thickness for ease of handling during manufacture and application. Preferred materials include birefringent, strain-hardening materials having a glass transition temperature equal to or lower than the polymers forming stack 208. A representative polymer suitable for base 202 is polyethylene terephthalate.

It is also possible to construct article 200 without base 202. For such constructions, stack 204 should contain a sufficient number of layers such that it forms a free-standing film having a thickness, e.g., in the range of about 3–5 microns. Optical coupling agent 208 is provided directly on a surface of stack 204.

Optical coupling agent 208 may be any clear material that will wet both the substrate and article 200. Typically, the coupling agent is an optical adhesive, e.g., a pressure sensitive adhesive or epoxy resin. Preferably, the index of refraction of coupling agent 208 is intermediate that of base 202 and the substrate.

Suitable materials for layer 206 include coatings to lower the surface energy and/or coefficient of friction of the article to aid in cleaning the article or preventing surface abrasions, and antistatic or electromagnetic interference coatings. Layer 206 may also be in the form of a protective skin layer that is either strippable or permanent (in which case it becomes part of the final article). For example, where article 200 is designed to reduce the reflectance at solid/solid interfaces such as the interface between a base film and a coating, layer 206 may take the form of a permanent skin layer having an index of refraction matched to that of the coating. Layer 206 may be applied after co-extrusion, but either prior to, or after, stretching. In addition, multiple layers may be used. In all cases where layer 206 is designed to become part of the final article, the thickness and index of refraction of layer 206 must be included as part of the AR stack optical design.

Article 200 may optionally include a functional coating or film (not shown) in between base 202 and coupling agent 208. Because it is placed on the back side of base 202, it does not affect the design or function of AR stack 204 located on the opposite side of base 202. Article 146, shown in FIG. 2B, may similarly include such a coating on the back side of base 144. Examples of suitable coatings include transparent conducting films for EMI shielding or IR rejection, anti-static films, UV protective coatings, colored or neutral grey coatings that control light transmission, and polarizing coatings.

The article shown in FIG. 2A may be used without laminating it to a substrate. It is useful in applications where high transparency is desired. Examples include protective face masks, goggles, window coverings that include a thermally insulating air gap, insulation layers inside multi-pane glass windows, overhead projection transparencies and associated covers, and high transparency wrapping material for packaging.

It is possible to eliminate base 134, in which case stacks 132 are provided in the form of a single, free-standing film. One or more layers for providing desired mechanical, chemical, and/or electrical properties may be included as well. For example, in the case of face masks and goggles, it may be desirable to include a hydrophilic coating to prevent fogging.

Figure 5:
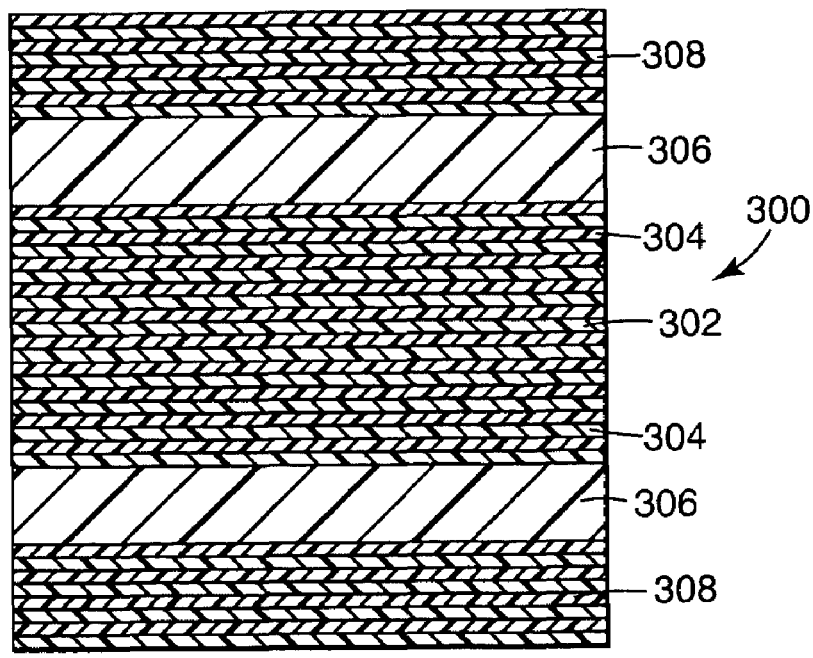
FIG. 5 is a schematic sectional view of an article featuring a multilayer base provided with a plurality of anti-reflective stacks separated by skin layers.

FIG. 5 shows an article 300 which may be optically coupled to a substrate to provide anti-reflective properties, or used by itself. It is particularly useful in applications where high color saturation and low glare are desired. Examples of such applications include edge filters with high transmission and sharp spectral cut-offs (including hot and cold mirrors), reflective color filters with high color purity in both reflection and transmission (e.g., for use as label stock, security/verification laminates, color filters for projection displays, visible colored window decorations, infrared reflecting window film, colored adhesive-backed tapes, colored gift wrap, colored packaging film, color films for advertising and the like, etc.), multilayer polymeric polarizers, and multilayer tear-resistant films having low glare.

As shown in FIG. 5, article 300 features a multilayer base 302 surrounded on each side with a multilayer anti-reflective stack 304. Each stack 304, in turn is provided with a skin layer 306, followed by another multilayer anti-reflective stack 308. Examples of the former include multilayer polymeric polarizers and mirrors. To protect outer anti-reflective stacks 308 during extrusion, article 300 may further be provided with strippable skin layers (not shown). Where article 300 is designed for application to a separate substrate, one of anti-reflective stacks 308 may be eliminated and replaced with an optical coupling agent (not shown) for coupling article 300 to the substrate.

Multilayer base 302 may be an article with utility on its own that gains functionality by addition of anti-reflective stacks, or it may be a base film that is added to an anti-reflective stack to give the anti-reflective stack additional mechanical strength or stiffness.

Anti-reflective stacks 304 are particularly useful in the case of multilayer optical film bases such as polarizers and mirrors. Preferably, anti-reflective stacks 304 are designed to suppress side band ripples and thereby aid in providing a uniformly low reflectivity at wavelengths outside of a high reflectivity bandstop, or on the low reflectivity side of an edge filter. Skin layers 306 (which effectively decouple the interference effects of anti-reflective stacks 308 and anti-reflective stacks 304) also help suppress the asymptotic sideband ripple from a stopband, as they are equivalent to immersing multi-layer stack 302 in a higher index medium. Anti-reflective stacks 308 further operate to eliminate the air/skin interface which is a source of reflection from the article.

Other embodiments are within the following claims.

What is claimed is:

1. An article in the form of a free-standing film comprising:
   (a) a base comprising a polymer layer having a major surface; and
   (b) an anti-reflective stack optically coupled to said major surface of said base that reduces the reflectivity of said base at said major surface over a wavelength range of interest,
   said stack consisting of at least four layers alternating between a layer of a first polymer and a layer of a second polymer, wherein the first polymer is a high index polymer and the second polymer is a low index polymer and the high index polymer has an index of refraction greater than the index of refraction of the base and the low index polymer has an index of refraction less than the index of refraction of the base.

2. An article according to claim 1 wherein the polymer layers of said base and said anti-reflective stack are selected from the group consisting of polymer compositions that are co-extrudable with each other.

3. An article according to claim 1 wherein said anti-reflective stack comprises a low index polymer layer selected from the group consisting of silicone polymers, fluoropolymers, fluoro-chloropolymers, methacrylate polymers, polyester copolymers, and combinations thereof.

4. An article according to claim 1 wherein said anti-reflective stack comprises a low index polymer layer comprising a vinylidene fluoride-tetrafluoroethylene-hexafluoropropylene terpolymer.

5. An article according to claim 1 wherein said anti-reflective stack comprises a high index polymer layer selected from the group consisting of polyesters, polycarbonates, polysulfones, polyethersulfones, and combinations thereof.

6. An article according to claim 1 wherein said anti-reflective stack comprises a birefringent polymer layer having two orthogonal optic axes parallel to the plane of said film.

7. An article according to claim 1 wherein each of the layers of said anti-reflective stack has a thickness no greater than about 1 micrometer.

8. An article according to claim 1 wherein said base comprises a plurality of alternating layers of a first polymer and a second polymer in which said first polymer has a higher index of refraction associated with at least one in-plane axis than adjoining layers of said second polymer.

9. An article according to claim 8 wherein said first polymer comprises polyethylene naphthalate and said second polymer comprises a polyethylene naphthalate copolymer.

10. An article according to claim 1 wherein said base comprises a multilayer reflective polarizer which selectively reflects light of one polarization and transmits light of a second polarization at normal angles of incidence over a second wavelength range of interest.

11. An article according to claim 1 wherein said base comprises a multilayer mirror that reflects light of two orthogonal polarizations at normal angles of incidence over a second wavelength range of interest.

12. An article according to claim 1 wherein said anti-reflective stack comprises a polymer layer having a refractive index that is greater than or equal to the highest refractive index of said base.

13. An article according to claim 1 wherein said base comprises a pair of opposed major surfaces, each of which is optically coupled to an anti-reflective stack.

14. An article in the form of a free-standing film comprising:
   (a) a base comprising a polymer layer having a major surface and a multilayer mirror that reflects light of two orthogonal polarizations at normal angles of incidence over a first wavelength range of interest; and
   (b) an anti-reflective stack optically coupled to said major surface of said base that reduces the reflectivity of said base at said major surface over a second wavelength range of interest said stack comprising alternating layers of (i) high index polymer; and (ii) low index polymer;
   wherein, the base and stack are formed of different polymers and the high index polymer has an index of refraction greater than an index of refraction of the base and the low index polymer has an index of refraction less than the index of refraction of the base.

* * * * *